Oct. 11, 1949.  R. J. DETUNO  2,484,613
HIGH-FREQUENCY INDUCTION HEATING APPARATUS
Filed July 7, 1945  2 Sheets-Sheet 1
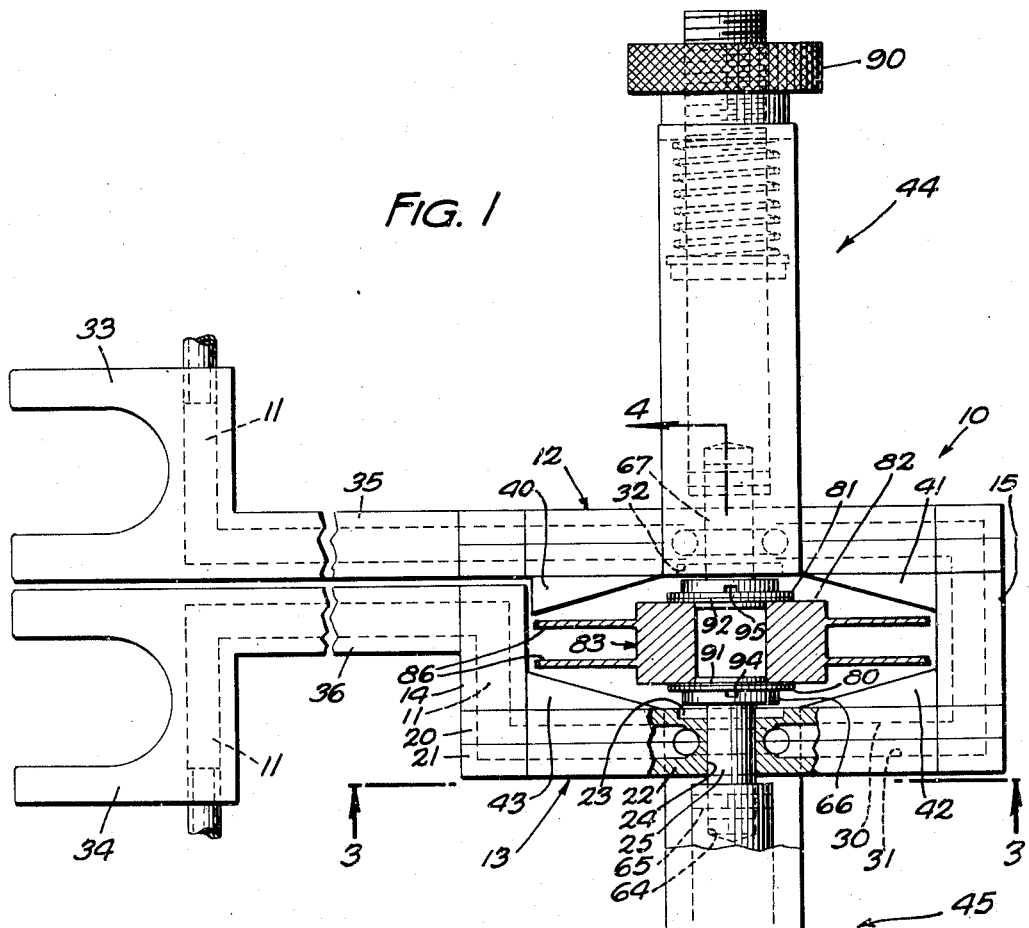
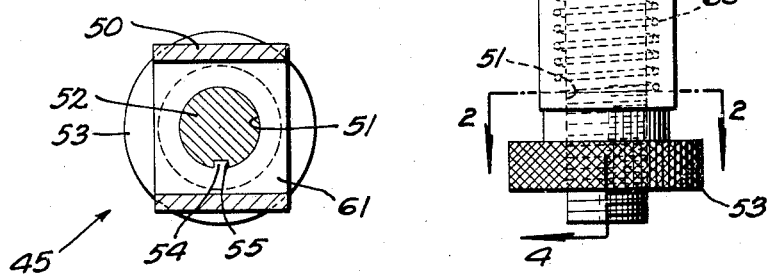
INVENTOR
R. J. DETUNO
BY Harry L. Duft
ATTORNEY Oct. 11, 1949.  R. J. DETUNO  2,484,613
HIGH-FREQUENCY INDUCTION HEATING APPARATUS
Filed July 7, 1945  2 Sheets-Sheet 2

INVENTOR
R. J. DETUNO
BY
ATTORNEY

Patented Oct. 11, 1949

2,484,613

UNITED STATES PATENT OFFICE 2,484,613

HIGH-FREQUENCY INDUCTION HEATING APPARATUS

Rocco J. Detuno, Chicago, Ill., assignor to Western Electric Company, Incorporated, New York, N. Y., a corporation of New York Application July 7, 1945, Serial No. 603,685

5 Claims. (Cl. 219—47)

1

This invention relates to high frequency induction heating apparatus and more specifically to a high frequency coil for brazing.

It is an object of this invention to provide an efficient high frequency induction heating coil that will more effectively concentrate and direct the magnetic flux through the part to be brazed during the brazing operation.

In one embodiment of this invention, single-turn coil of a hollow conductor is connected to the output of a high frequency oscillator of a type used in high frequency heating. The sides of the coil turn are provided with inside extensions to vary the flux distribution to accentuate heating at selected points and with enlargements to lengthen the path of flux through the part to be brazed. Clamps secured to the coil hold the parts to be brazed in the most effective position. Just prior to the brazing and during the cooling period, the interior of the work is flushed with carbon dioxide washed through alcohol to keep oxidation at a minimum. Water is circulated through the hollow conductor to keep the coil cool.

A complete understanding of the invention may be had by reference to the following description when considered in conjunction with the accompanying drawings, in which Fig. 1 is a plan view of an apparatus embodying the invention with the magnetron tube shown in section;

Fig. 2 is a vertical section of a clamp assembly shown in Fig. 1 and taken on the line 2—2 of Fig. 1;

Figure 3:
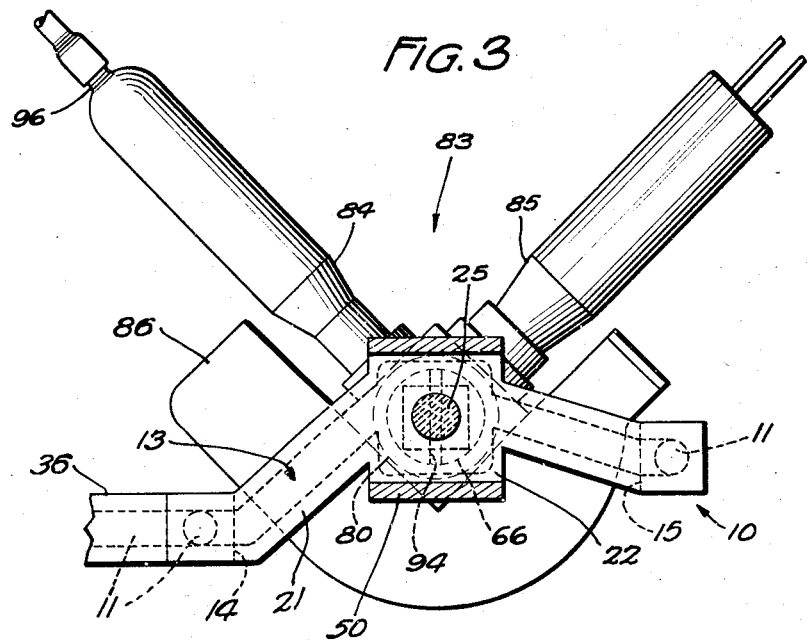
Fig. 3 is a vertical section of the apparatus taken on the line 3—3 of Fig. 1.
Figure 4:
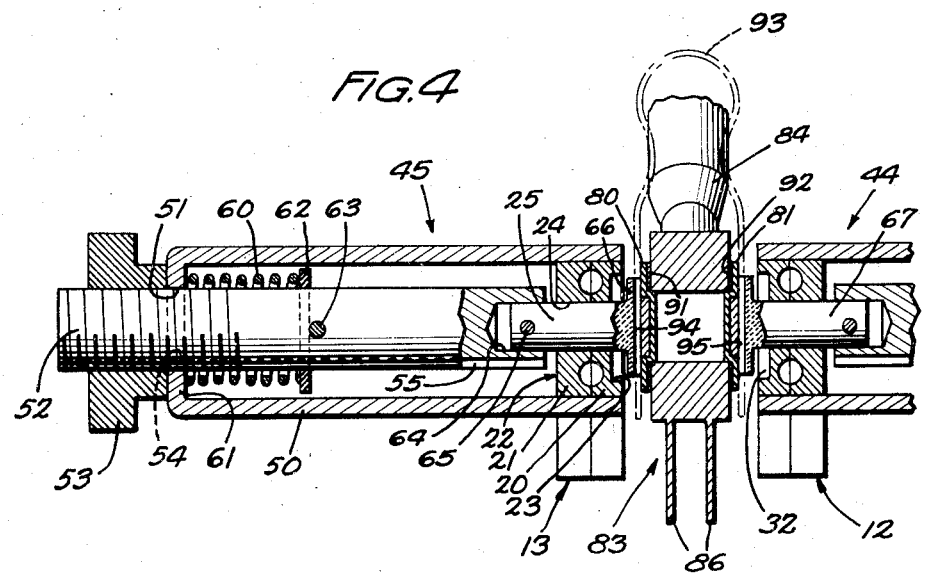
Fig. 4 is a vertical section through the apparatus taken on the line 4—4 of Fig. 1.

Referring to the drawings, it will be seen that the apparatus is provided with a single-turn rectanguluar coil 10 having a cooling duct 11 extending through it. For the sake of convenience in manufacture, the turn of the coil is in four main sections; the two sides 12 and 13, and the two ends 14 and 15. The side 13 is formed by brazing together two similar irregularly shaped pieces 20 and 21, each being substantially rectangular in cross section and having an enlargement 22 at about the mid-section in which a recess 23 and an aperture 24 are formed to support

2 and guide a clamping element 25 hereinafter more fully described. Due to the increased area at the enlargement 22, the impedance at that point is reduced, and a greater radiating surface is presented toward the part to be heated. The enlargement 22 increases the width of the conductor in the axial direction of the loop formed by the conductor, whereby the path of the magnetic flux through an article in the loop is lengthened and the heating effect is extended over a larger area of the article than could be obtained by a narrower conductor. Adjacent the enlargement, the conductor is narrower since it is not desired to heat the article in this region. A clear conception of the enlargement 22 may be had by referring to Fig. 3 where it appears substantially square in outline. Channels 30 and 31 are formed in the adjoining faces of the pieces 20 and 21 so that when the pieces are brazed together, the channels 30 and 31 combine to form part of the cooling duct 11. At the enlargement 22, the duct 11 divides to take a circuitous path around the aperture 24. The construction of the side 12 of the coil turn is similar to that of the side 13 except that the duct 11 turns upward at both ends of the side 13 (Fig. 1), whereas in the side 12, the duct 11 is straight at the left end and turns downward at the right end, and in addition the recess 23 faces a recess 32 formed in the side 12.

The left end section 14 (Fig. 1) is formed from a bar having a square cross section and having suitable holes drilled in it to form part of the cooling duct 11. At the right end, the section 15 is also formed from a square bar with an aperture drilled through it to provide a link in the cooling system. Electrical and mechanical continuity is obtained by brazing together the respective sections of the coil turn.

Means to electrically connect the coil to the output of a high frequency heating transformer is provided in a pair of substantially U-shaped terminals 33 and 34 connected to the coil through two leads 35 and 36. The terminals and leads are suitably drilled and bored to provide passageways to give continuity to the cooling duct 11. The inlet of the cooling duct is at one terminal and the outlet at the other.

To accentuate heating at selected points of the part to be heated, the flux distribution within the coil turn is varied by securing conducting non-magnetic members 40, 41, 42 and 43 to the inside of the coil turn. These members are as wide as the sections of the coil turn to which they are secured, and their shape is such as to change the inside form of the coil turn to adapt it to the contour of the part to be heated.

A pair of oppositely disposed clamping means 44 and 45 are secured to the opposite sides of the coil, and the construction of both being substantially the same, a detailed description of only one is herein given. Secured to the side 13 of the coil turn are the legs of a U-shaped supporting member 50 having an aperture 51 formed in its closed end to guide a partially threaded rod 52 which extends through it. One end of the rod 52 is threadedly engaged by a knurled nut 53 which may be adjusted to vary the limit of travel of the rod. Turning of the rod 52 is prevented by a key 54 engaging a groove 55 in the rod 52. The rod 52 is continuously urged toward the center of the coil turn by an encircling helical compression spring 60 which exerts an expansive force between the yoke 61 of the member 50 and a washer 62 which encircles the rod and is held in place by a pin 63. At the other end of the rod 52 a hole 64 forms a receptacle for the shank of the clamping elements 25 which is held in place by a pin 65. The clamping element 25, which is made from a heat resistant electrical insulator such as domestic lava, is provided at one end with a flat plate 66 to engage the work assembly that is to be held together. The side 12 of the coil turn is provided with a clamping element 67 and associated parts similar to but diametrically opposed to those on the side 13 of the coil 10. Urged toward each other by their associated springs, the clamping elements 25 and 67 cooperate to clamp the work assembly within the coil turn so that the parts to be brazed will occupy the space having the greatest heating effect.

The embodiment disclosed herein is used to braze copper end caps 80 and 81 to a copper anode 82 of a magnetron tube 83. The magnetron tube is provided with copper-to-glass seals 84 and 85 which might be damaged if exposed to brazing heat. This coupled with the fact that the tube is provided with odd-shaped cooling fins 86 explains the necessity for the irregular shape of the sides 12 and 13 of the coil turn which is most clearly illustrated in Fig. 3. The angular shape of the sides keep the copper-to-glass seals 84 and 85 away from the space in the coil turn where the heating effects are the greatest.

In practice, the clamping elements 25 and 67 are retracted by grasping the nut 53 and a nut 90, and pulling outwardly against the bias of the springs 60. Silver solder rings 91 and 92 are placed between the anode block 82 and the end caps 80 and 81 which are held in place temporarily by a hairpin spring 93. This assembly is then placed between the clamping elements 25 and 67 which are urged toward each other by loosening the nuts 53 and 90, thus clamping the assembly together. Grooves 94 and 95 are provided in the plates of the clamping elements to recess the hairpin spring 93 which may be removed when the parts are held together by the clamping elements 25 and 67.

Just prior to the induction of brazing heat in the parts to be brazed, the joints are flushed with a neutral atmosphere, such as carbon dioxide+alcohol vapor, which is applied to the parts by forcing the mixture under pressure through the anode envelope 96 of the magnetron tube. Pressure is lowered during the actual brazing to prevent the solder from being blown out. During the cooling period the pressure is again resumed. The coil is cooled by circulating a coolant such as water through the duct 11.

The coil, leads and the terminals are preferably made from copper having a large enough cross-sectional area to carry the unusually heavy currents flowing in this part of a high frequency heating apparatus. As the frequency is increased, it is desirable to increase the surface area of these parts to accommodate and take full advantage of the "skin effect."

What is claimed is:

1. A high frequency heating apparatus comprising a single-turn coil having apertures in opposite sides of the coil, clamping members made of heat resistant insulating material extending through said apertures and engageable with work to be heated, means for resiliently urging said clamping members into said coil to hold and support the work, and means for withdrawing said members to release the work.

2. A high frequency heating apparatus comprising a single-turn coil having an aperture formed in one side of the coil, an insulating clamping member extending into said coil through said aperture for holding work to be heated, means for resiliently urging said clamping member into said coil to hold the work in a predetermined position in said means comprising a U-shaped supporting frame secured to one side of said coil, said supporting frame having an aperture formed in the closed end, a rod supported and guided in the aperture of said supporting frame, said rod being connected to one end of said clamping member, a spring to urge said rod toward the center of the coil, thereby urging the clamping member toward the center of the coil to hold and support the work, and means for withdrawing said clamping member to release the work.

3. A high frequency heating apparatus comprising a single-turn coil enclosing a predeterminted area, electrical terminals for said coil, flux distributing lug extension secured to portions of the inner periphery of said coil and extended inwardly thereof, and clamping means mounted on said coil and adapted to hold a part to be heated in a predetermined position with respect to the coil and the flux distributing lug extensions, said clamping means including a clamping member made of heat resistant electrical insulating material engageable with said part and extending into the area enclosed within said coil.

4. A high frequency heating apparatus comprising a loop formed from an electrical conductor and adapted to receive a part to be heated, the cross section of said conductor along a line substantially parallel to the axis of said loop being relatively narrow where less heating is desired and relatively wide where more heating is desired, inwardly extending electroconducting non-magnetic members secured to the inside of said loop to vary the flux distribution within said loop, and clamping means secured to said loop to hold and support the part to be heated in a predetermined position, said clamping means having a movable clamping face made of electrical insulating material and extending into said loop.

5. A high frequency heating apparatus comprising a single-turn loop formed about a predetermined axis from an electrical conductor and adapted to receive a part to be heated, a portion of the conductor on one side of said loop having a flux distributing enlargement extending in a direction substantially parallel to the axis of the loop, and clamping means supported by said loop to hold and support the part to be heated in a predetermined position, said clamping means comprising an insulated clamping member extending into said loop and resiliently urged in that direction.

ROCCO J. DETUNO.

REFERENCES CITED

The following references are of record in the file of this patent:

UNITED STATES PATENTS

| Number | Name | Date |
| --- | --- | --- |
| 2,003,855 | Fredrickson | June 4, 1935 |
| 2,144,377 | Kennedy | Jan. 17, 1939 |
| 2,271,916 | Denneen et al. | Feb. 3, 1942 |
| 2,299,934 | Sherman et al. | Oct. 27, 1942 |
| 2,335,495 | Fink | Nov. 30, 1943 |
| 2,348,361 | Rudd et al. | May 9, 1944 |
| 2,394,944 | Stanton | Feb. 12, 1946 |
| 2,397,990 | Sherman | Apr. 9, 1946 |

OTHER REFERENCES

Curtis: "High Frequency Induction Heating," first edition, fourth impression, 1944, McGraw-Hill Book Company, Inc., New York. Page 204.